J. E. HASCHKE.
SPEED CONTROL SYSTEM FOR ELECTRIC TRACTION MOTORS.
APPLICATION FILED JUNE 24, 1912.
1,186,658.
Patented June 13, 1916.
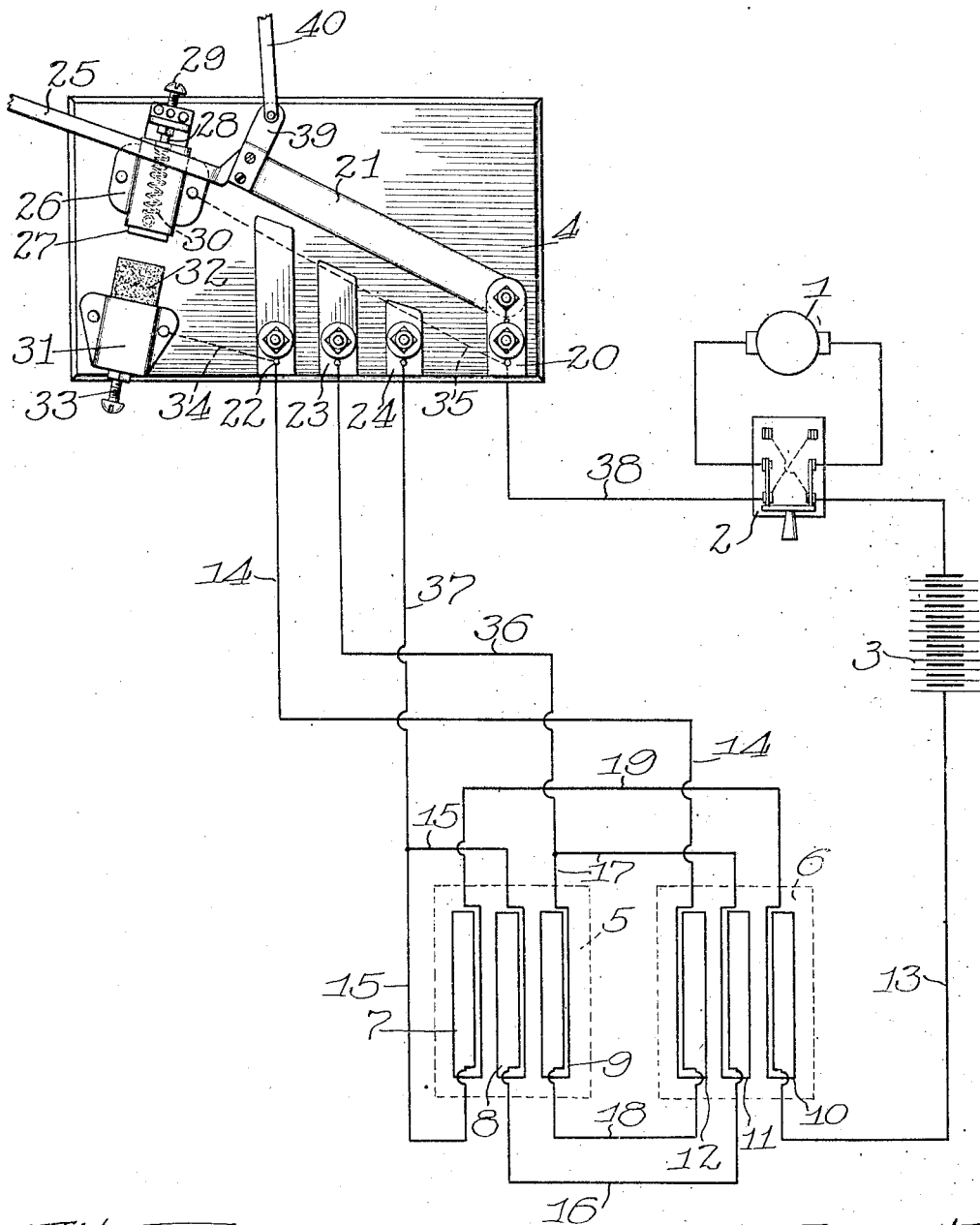

UNITED STATES PATENT OFFICE.

JULIUS E. HASCHKE, OF CHICAGO, ILLINOIS.

SPEED-CONTROL SYSTEM FOR ELECTRIC TRACTION-MOTORS.

1,186,658.  Specification of Letters Patent.  Patented June 13, 1916.

Application filed June 24, 1912. Serial No. 705,420.

*To all whom it may concern:*

Be it known that I, JULIUS E. HASCHKE, a citizen of the United States, residing at Chicago, in the county of Cook and State of Illinois, have invented certain new and useful Improvements in Speed-Control Systems for Electric Traction-Motors, of which the following is a specification.

This invention relates to a system for controlling the speed and torque of electric motors and is more particularly designed and intended for use in connection with electric automobiles, launches and the like, but of course, may have a more general application to electric traction service of any class where a variable speed or torque is desired.

The principal object of the invention is to provide an improved, simple and reliable system of control by means of which variable speed and torque may be obtained in an effective and efficient manner.

More particularly, the object of the invention is to provide a system of control of the class described by means of which it is possible to utilize current from a battery at a substantially constant potential, and to vary the speed of an electric motor without the insertion or removal of resistance pure and simple, from the circuit.

A further object of the invention is to provide a system of control of the class described in which the field coils of a motor are wound in sections or are provided with suitable connection taps so that one or more corresponding sections of the field winding upon each pole may be simultaneously cut out, whereby the speed and torque of the motor may be varied.

For the attainment of these ends and the accomplishment of other new and useful objects, as will appear, the invention consists in the features of novelty in the construction, combination and arrangement of the several parts generally shown in the accompanying drawing and described in the specification, but more particularly pointed out in the appended claims.

In the drawing, the figure is a diagrammatic representation of a speed control system embodying the features of my invention.

In utilizing current from a source of electric current supply, such, for example, as a battery or any other source of current supply having a substantially constant potential, it is customary to employ what is known as a series parallel system or to control the speed of the motor by the insertion and removal of resistance or by a combination of the two systems. A modification of either one or both of these systems is commonly employed at the present time in controlling the speed of an electric car or more particularly an electric automobile. When resistance is inserted, there is a loss of power due to the resistance itself, which, of course, is objectionable. In the series parallel system, the storage battery is provided with a number of connections by means of which a current of reduced potential may be drawn from the battery or source of supply. This method of discharge is unsatisfactory because certain sections of the storage battery are discharged in parallel.

It is the common practice to charge storage batteries in series and if they are discharged in parallel, it is almost impossible to discharge them equally for the reason that the controller contacts, by means of which the various battery connections are made, do not convey the currents with like conductivity, owing to the difference in pressure of the several contacts. Also the atmospheric conditions differ and the acid vapor formed has a different effect upon batteries which have a free circulation of air and those which do not have such a free circulation thereby causing a difference in potential of the different cells. This may come about from the fact that the different cells of the battery are disposed within a receptacle where there is an unequal circulation of air for other similar reasons. When different sections of a battery are connected in parallel, a weaker section will cause cross currents to flow between it and the stronger sections, thereby resulting in a loss of power and of efficiency. In the present invention, the current is drawn from the battery at the same potential under all circumstances and the current derived therefrom is discharged in the same way in which the battery is charged, that is, through all the cells connected in series, thereby preventing the unequal discharge of certain cells and preventing heavy cross currents between sections of the battery when connected in parallel.

Referring now more particularly to the drawing, the armature 1 of an electric motor is connected through a double throw switch 2 in series with a storage battery 3 through a controller 4 and through the field coil windings of the motor. In the present exemplification of the invention, the motor is represented as being provided with two field coils 5 and 6, although, of course, any number of field coils may be employed. These field coils 5 and 6 are provided with windings in corresponding sections, the sections 7, 8 and 9 of one field coil corresponding to the sections 10, 11 and 12 of the other. The corresponding sections are connected in series and the different sections are all connected in series. When the field coils are all connected in series, the circuit may be traced from a conductor 13, which connects one of the field coils as 10 to one side of the battery 3, through all of the windings and by means of a conductor 14 to a suitable terminal of the controller 4.

The controller 4 comprises a terminal 20 to which is pivotally connected an arm 21. A plurality of contact members or clips 22, 23 and 24 are so disposed with respect to the arm 21 that they will be engaged and electrical connection made therewith at different points in the rotation of the arm, the arm remaining in contact with each contact member after it contacts with the succeeding one. Extending from the contact arm 21, is a projection 25 which may be formed integral with the arm or secured thereto in any suitable manner. Disposed beneath this projecting portion 25 is a bracket 26 in which a contact plate 27 is movable. This plate is provided with a detent or stop 28 adjustable by means of a screw 29, which is disposed in the path of movement of the projecting portion 25 and a spring 30 is connected to the bracket 26 and to the plate 27 in such a manner as to tend to press the plate outwardly at one end of the bracket. The engagement of the projection 25 with the detent 28 is operative when moved in one direction to retract the plate and when moved in the other direction, to permit the spring to act in moving it outwardly. Disposed in the path of movement of the plate is a holder 31 in which a conductor 32 is mounted. This conductor is preferably constructed of some high resistance material such, for example, as carbon or the like, and a holder is provided with an adjusting screw 33, by means of which the position of the conductor 32 may be adjusted. This conductor 32 is so disposed that the contact plate 27 will make electrical connection therewith when the arm 21 is moved in a direction to permit the spring 30 to act in projecting the plate. The projection 25 is so disposed that when the arm 21 is moved toward the contact members 22, 23 and 24, the plate 27 will be allowed to contact before the electrical connection is made between the arm 21 and the contact 22 and also in moving the arm 21 in the other direction the electrical connection between the contact 32 and the plate 27 is not broken until after the arm 21 is moved out of engagement with the contact member 22. This is for the purpose of preventing arcing at the tip of the contact member 22 and along the edge of the arm 21. The holder 31 is connected to the contact 22 by means of a conductor 34 and the bracket 26 is electrically connected to the terminal 20 by means of a conductor, both of the conductors 34 and 35 being shown in dotted lines in the drawing.

The several parts of the field windings are connected in series by means of conductors 15, 16, 17, 18 and 19. The conductor 36 forms connection between the conductor 17 and one of the contact members as 23 and the conductor 37 forms connection between the conductor 15 and the other contact member 24. A conductor 38 forms connection between the double throw switch 2 and the terminal 20.

In operation, when it is desired to impel the motor in either direction, the switch 2 is thrown in the desired direction and the arm 21 is moved in the direction of the contact members, first making connection between the contact 32 and the contact plate 27 and at approximately the same time making connection with the contact member 22, whereupon a circuit is closed from one side of the battery to and through conductor 13, coil 10, conductor 19, coil 7, conductor 15, coil 8, conductor 16, coil 11, conductor 17, coil 9, conductor 18, coil 12, conductor 14, contact member 22, arm 21, terminal 20, conductor 38, switch 2, armature of the motor and to the other side of the battery. Thus, it will be seen that all of the sections of the pole windings are connected in series and are also in series with the armature of the motor. It will also be noted that the coils and armature in series are connected across the battery so that the full potential of the battery will be effective. By moving the arm 21 further in the direction of the contacts until electrical connection is made with the contact member 23, coils 9 and 12 will be short-circuited and the current will pass directly from coil 11 to conductor 17, conductor 36 and contact member 23 to the arm 21. Similarly, the further movement of the arm 21 in the same direction will short-circuit coils 8 and 11, connection being made with the conductor 15 by means of the conductor 37 and the contact member 24 with the arm 21. Thus, it will be seen that corresponding sections of each of the pole windings will be short-circuited by the movement of the contact arm 21. The current which flows through the coil windings and through the armature of the motor will thus be varied in accordance with the movement of the arm 21, resulting in a corresponding change of speed for each different position of the arm.

It will be obvious that although the present embodiment of the invention is described as having a motor with only two poles, there may be any desired number of poles with the corresponding coils of each pole winding connected similarly to those shown and described in the present exemplification of the invention. The additional windings might either be in parallel or in series with the corresponding sections of the windings as shown, the object being to short-circuit the corresponding coil sections of each pole winding simultaneously. This results in a harmonious variation of the pole strength of each pole since the current will be the same in each one of the pole windings. The armature of this motor is always in series with the fields and since it is a series motor, the starting torque is very large. If desired, the controller may be operated by means of the projecting portion 25 of the arm 21 or an additional connection 39 may be provided to which a rod 40 is secured and operated in any desired or suitable manner.

While I have thus described the preferred embodiment of my invention, it is evident that others skilled in the art to which this relates, may make various changes in the construction, combination and arrangement of the several parts which constitute my invention, without departing from the spirit and scope thereof.

What I claim is:

1. A speed control system for electric motors comprising a motor having field coils, each wound in separate sections, the first section of one of the field coils being connected in series with the first section in the other field coil, the last mentioned section being connected in series with the second section of the second mentioned field coil and said second section of the second mentioned field coil being connected in series with the second section of said first mentioned field coil; a contact point connected with the second mentioned coil on the first mentioned field; a contact point connected to the first mentioned coil on the second mentioned field; and a member adapted to electrically engage said points successively and remain in engagement with the first point engaged after engaging the second point.

2. A speed control system for electric motors comprising a motor having field coils, each wound in separate sections, the first section of one of the field coils being connected in series with the first section in the other field coil, the last mentioned section being connected in series with the second section of the second mentioned field coil and said second section of the second mentioned field coil being connected in series with the second section of said first mentioned field coil, the latter section being connected in series with the third section of the second mentioned field coil and the latter section being connected in series with the third section of said first mentioned field coil; a controller having contact points; one of such points being connected with the first section of said second mentioned field coil, another of said points being connected with the third section of said second section field coil and another of said points being connected with the third section of the first mentioned field coil; and a member adapted to electrically engage each of said points successively and remain in engagement with the first point engaged after engaging the second point and with the first and second points after engaging the third point.

In testimony whereof I have signed my name to this specification, in the presence of two subscribing witnesses, on this 21st day of June A. D. 1912.

JULIUS E. HASCHKE.

Witnesses:
CHARLES H. SEEM,
KENT W. WOUNELL.